(12) United States Patent
Wei et al.

(10) Patent No.: US 11,984,814 B2
(45) Date of Patent: May 14, 2024

(54) OPEN LOOP PHASE PRE-CHARGE

(71) Applicant: Rockwell Automation Technologies, Inc., Mayfield Heights, OH (US)

(72) Inventors: Lixiang Wei, Mequon, WI (US); Peizhong Yi, Mequon, WI (US); Robert W. Reese, Mequon, WI (US); Brian P. Brown, Mequon, WI (US); Jatinkumar Patel, Mequon, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 364 days.

(21) Appl. No.: 17/033,442

(22) Filed: Sep. 25, 2020

(65) Prior Publication Data
US 2022/0103090 A1 Mar. 31, 2022

(51) Int. Cl.
| | |
|---|---|
| *H02P 27/08* | (2006.01) |
| *H02M 1/08* | (2006.01) |
| *H02M 7/217* | (2006.01) |
| *H02P 6/12* | (2006.01) |
| *H02P 27/06* | (2006.01) |
| *H02M 1/00* | (2006.01) |

(52) U.S. Cl.
CPC .......... *H02M 7/2173* (2013.01); *H02M 1/083* (2013.01); *H02P 27/06* (2013.01); *H02M 1/0058* (2021.05); *H02P 2201/01* (2013.01)

(58) Field of Classification Search
CPC ................. H02M 5/10; H02M 3/07
See application file for complete search history.

(56) References Cited

U.S. PATENT DOCUMENTS

| | | | | |
|---|---|---|---|---|
| 3,849,719 | A * | 11/1974 | Geiersbach | H02M 7/1623 363/161 |
| 5,986,901 | A * | 11/1999 | Weng | H05B 41/28 363/44 |
| 7,619,906 | B2 | 11/2009 | Schnetzka | |
| 8,154,895 | B2 | 4/2012 | Gilmore | |
| 2018/0145602 | A1* | 5/2018 | Wei | H02M 5/458 |
| 2019/0280586 | A1* | 9/2019 | Chen | H02M 1/4208 |

\* cited by examiner

*Primary Examiner* — Kawing Chan
*Assistant Examiner* — Charles S Laughlin
(74) *Attorney, Agent, or Firm* — Foley & Lardner LLP

(57) ABSTRACT

For open loop phase pre-charge, an apparatus includes a Switching Mode Power Supply (SMPS) charging diode and a charge generator. The SMPS charging diode pre-charges an SMPS to a regulation set point from at least one phase of an Alternating Current (AC) voltage. The charge generator is powered by the pre-charged SMPS. In response to detecting the regulation set point iteratively, the charge generator detects a specified phase angle of the AC voltage. In response to the specified phase angle, the charge generator iteratively generates a charging voltage during positive voltage interval that charges a Direct Current (DC) bus capacitor to a target DC bus voltage within a charging time interval. At least a portion of the charge generator comprises one or more of hardware and executable code, the executable code stored on one or more computer readable storage media.

20 Claims, 16 Drawing Sheets

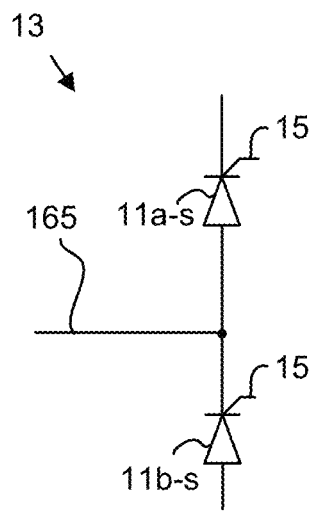
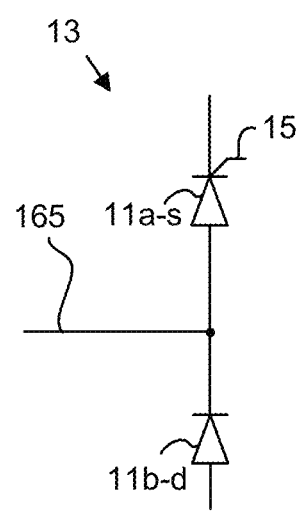
FIG. 1C
FIG. 1D
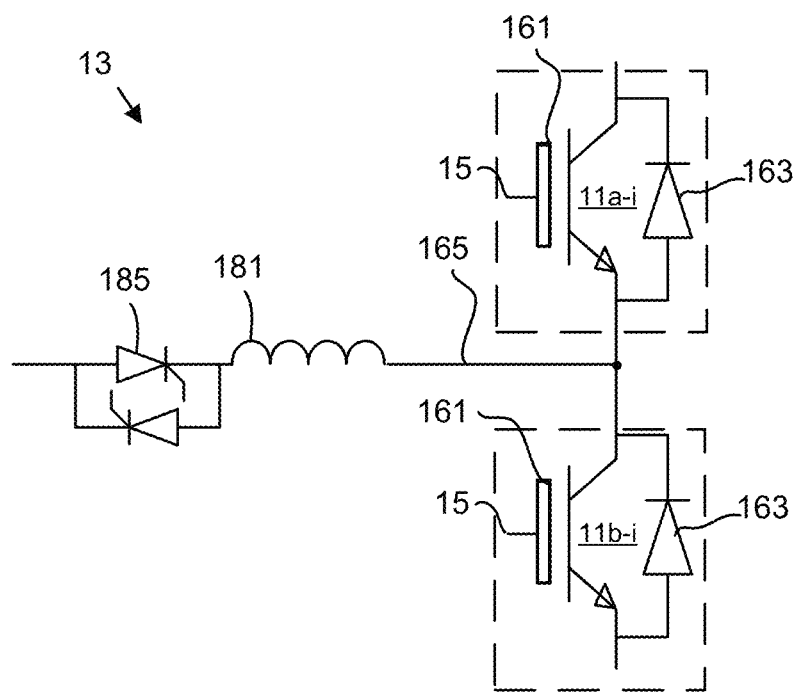
FIG. 1E

OPEN LOOP PHASE PRE-CHARGE

BACKGROUND INFORMATION

The subject matter disclosed herein relates to open loop phase pre-charging.

BRIEF DESCRIPTION

An apparatus for open loop phase pre-charge is disclosed. The apparatus includes a Switching Mode Power Supply (SMPS) charging diode and a charge generator. The SMPS charging diode pre-charges an SMPS to a regulation set point from at least one phase of an Alternating Current (AC) voltage. The charge generator is powered by the pre-charged SMPS. In response to detecting the regulation set point iteratively, the charge generator detects a specified phase angle of the AC voltage. In response to the specified phase angle, the charge generator iteratively generates a charging voltage during positive voltage interval that charges a Direct Current (DC) bus capacitor to a target DC bus voltage within a charging time interval. At least a portion of the charge generator comprises one or more of hardware and executable code, the executable code stored on one or more non-transitory computer readable storage media.

A method for open loop phase pre-charge is also disclosed. The method pre-charges an SMPS to a regulation set point from at least one phase of an AC voltage. The method detects the regulation set point. In response to detecting the regulation set point, the method iteratively detects a specified phase angle of the AC voltage. In response to detecting the specified phase angle, the method iteratively generates a charging voltage during a positive voltage interval that charges a DC bus capacitor to a target DC bus voltage within a charging time interval.

A system for open loop phase pre-charge is also disclosed. The system includes a motor, a motor inverter, and a rectifier that supplies power to the motor inverter. The rectifier includes an SMPS charging diode and a charge generator. The SMPS charging diode pre-charges an SMPS to a regulation set point from at least one phase of an AC voltage. The charge generator is powered by the pre-charged SMPS. In response to detecting the regulation set point iteratively, the charge generator detects a specified phase angle of the AC voltage. In response to the specified phase angle, the charge generator iteratively generates a charging voltage during positive voltage interval that charges a DC bus capacitor to a target DC bus voltage within a charging time interval. At least a portion of the charge generator comprises one or more of hardware and executable code, the executable code stored on one or more non-transitory computer readable storage media.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 1C is a schematic diagram of a Silicon Controlled Rectifier (SCR)/SCR serial device pair according to an embodiment;

FIG. 1D is a schematic diagram of a SCR/diode serial device pair according to an embodiment;

FIG. 1E is a schematic diagram of an Insulated Gate Bipolar-Transistor (IGBT)/IGBT serial device pair according to an embodiment;

DETAILED DESCRIPTION

Figure 1A:
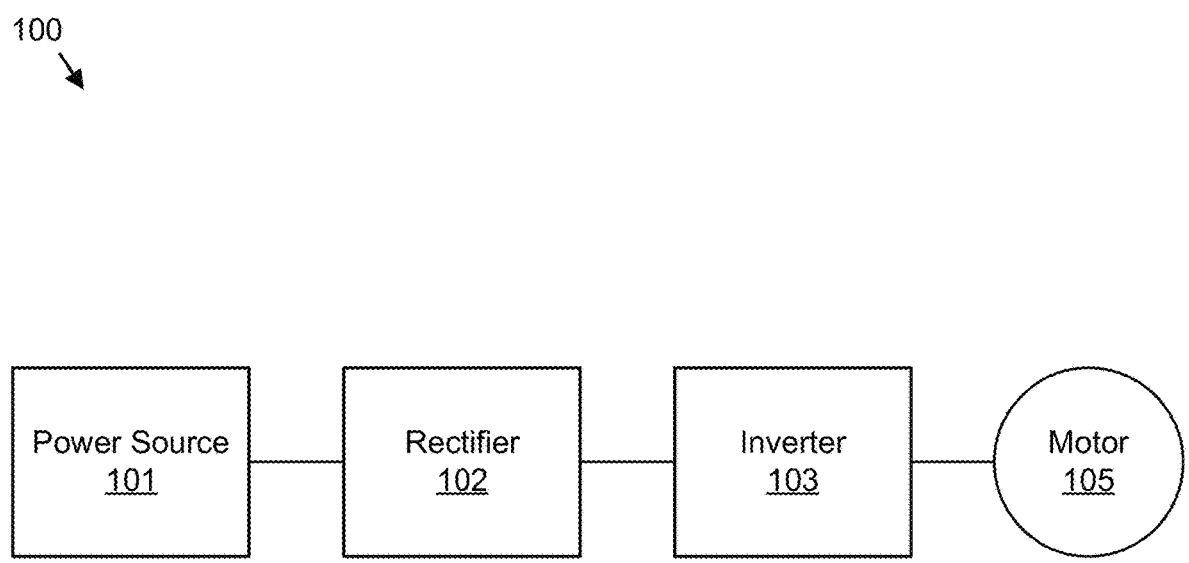
FIG. 1A is a schematic block diagram of a motor system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a motor system 100. The motor system 100 may drive a motor 105. In the depicted embodiment, the motor system 100 includes a power source 101, a rectifier 102, a motor inverter 103, and the motor 105. The power source 101 provides electrical power for the rectifier 102. The motor inverter 103 may drive the motor 105 with electrical power from the rectifier 102. The motor system 100 may be a Variable Frequency Drive (VFD). The rectifier 102 may need to be charged before the rectifier 102 can operated and supply electrical power to the motor 105. As a result, operation of the motor 105 is delayed until the rectifier 102 is charged.

In the past, the motor inverter 103 have been pre-charged with resistor-based pre-charged circuits. Unfortunately, resistor based pre-charged circuits consume power and generate waste heat. The embodiments described herein pre-charge the motor inverter 103 rectifier 102 with reduced component costs including without a pre-charge resistor as will be described hereafter. In addition, the embodiments pre-charge the motor inverter 103 rectifier 102 open loop, further reducing component costs.

Figure 1B:
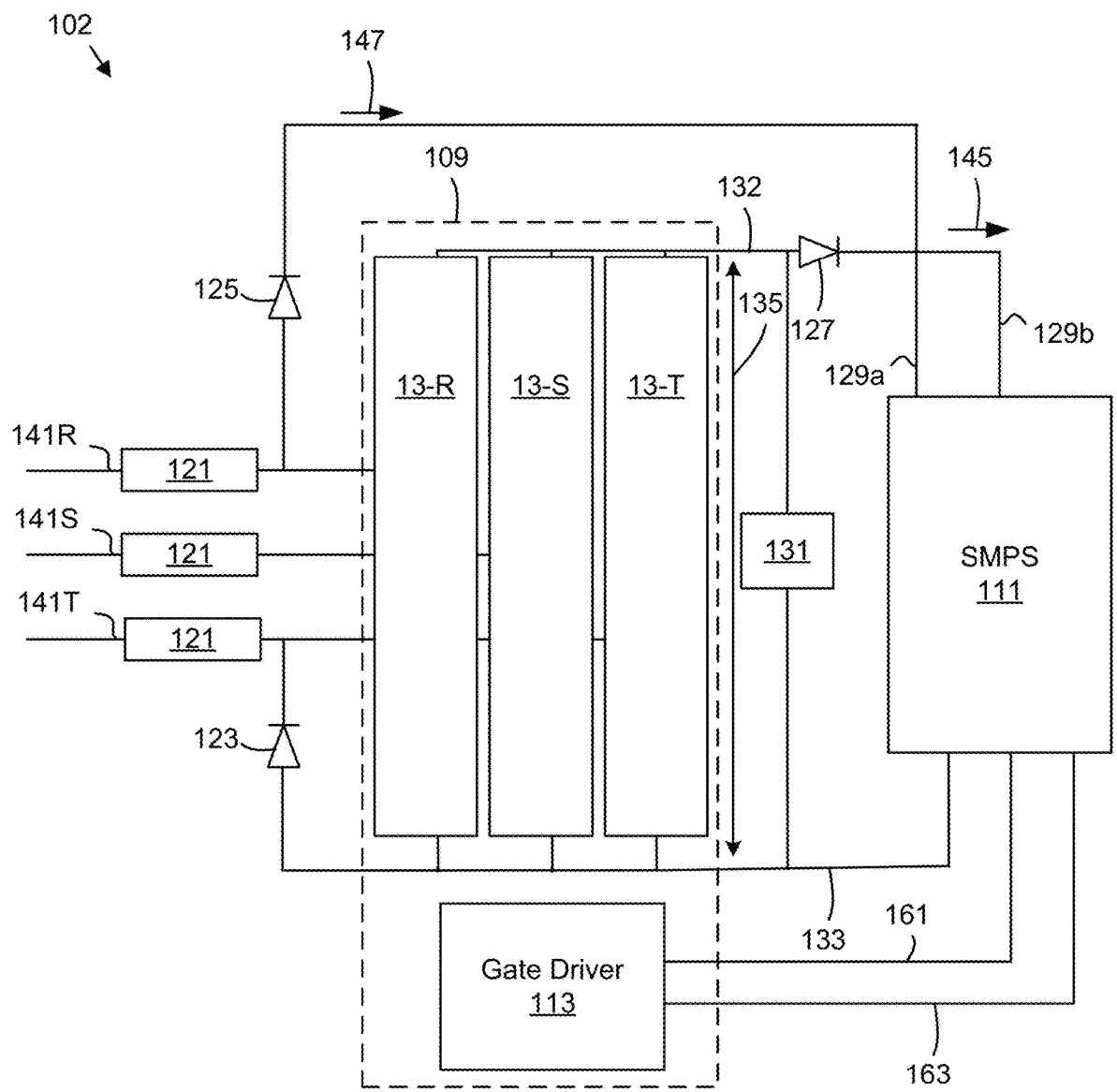
FIG. 1B is a schematic block diagram of a rectifier according to an embodiment.

FIG. 1B is a schematic block diagram of the rectifier 102. In the depicted embodiment, the rectifier 102 includes a charge generator 109 and an SMPS 111. At least a portion of the charge generator 109 comprises one or more of hardware and executable code. The executable code may be stored on one or more non-transitory computer readable storage media. The charge generator 109 and SMPS 111 receive an AC voltage 141. In the depicted embodiment, the AC voltage 141 includes R, S, and T phases. Each phase of the AC voltage 141 may be filtered by a filter 121. The filters 121 are described in more detail in FIG. 1I.

At least one phase of the AC voltage 141 is provided to the SMPS 111 through an SMPS charging diode 125 at a charging input 129*a* as a charging current 147. At least one other phase of the AC voltage 141 may be connected to a common 133 of the SMPS 111 via a return diode 123.

The SMPS charging diode 125 and/or charging current 147 pre-charges the SMPS to a regulation set point. The charge generator 109 detects the regulation set point and powers up. In one embodiment, the gate driver 113 powers up from an SMPS output 161 and an SMPS common 162 when the regulation set point is reached by the SMPS 111.

The gate driver 113 may generate gate signals for three serial device pairs 13. The gate driver 113 may detect a specified phase angle of the AC voltage 141. In response to the specified phase angle, the gate driver 113 may direct the serial device pairs 13 to generate a charging voltage 135 during a positive voltage of the AC voltage 141 that charges a DC bus capacitor 131 to a target DC bus voltage. Because the gate driver 113 actively controls the serial device pairs 13 to only generate the charging voltage 135 during positive voltages, no pre-charge resistor is needed in series with the DC bus capacitor 131. As a result, the efficiency of charging and operating the rectifier 102 is improved.

The serial device pairs 13 may drive a charging line 132. The charging line 132 may charge the DC bus capacitor 131 to the target DC bus voltage. In one embodiment, the DC bus capacitor 131 is charged to the target DC bus voltage within a charging time interval. The charging time interval may be less than 2 line cycles of the AC voltage 141.

The serial device pairs 13 may supply a SMPS current 145 via an DC charge diode 127 to the SMPS 111 at the charging voltage 135. The DC charge diode 127 may block current from the SMPS 111 to the DC bus capacitors 131. In one embodiment, the DC charge diode 127 is only rated to charge the SMPS 111.

The gate driver 113 may control the serial device pairs 13 to charge the DC bus capacitor 131 to the target DC bus voltage. The SMPS 111 may supply power to the motor inverter 103 for driving the motor 105. By pre-charging the SMPS 111 to the regulation set point, powering up the gate driver 113 at the regulation set point, and charging the DC bus capacitor 131 under the control of the gate driver 113, the embodiments reduce the interval from power on to operation for the motor system 100. In addition, the embodiments eliminate the need for a pre-charge resistor, increasing the maximum capacitance of the DC bus capacitor 131, and increasing the efficiency of the motor system 100.

FIG. 1C is a schematic diagram of a SCR/SCR serial device pair 13. Each serial device pair 13 may comprise a first device 11a and second device 11b. One phase of the AC voltage 141 connects to the serial device pair 13 at a midpoint 165 of the first device 11a and the second device 11b. In the depicted embodiment, the first device 11a is a SCR device 11a-s and the second device 11b is a SCR device 11b-s. Each SRC device 11a/b-s may be controlled by a gate signal 15 from the gate driver 113. Each gate signal 15 may be independent of other gate signals 15.

FIG. 1D is a schematic diagram of a SCR/diode serial device pair 13. In the depicted embodiment, the first device 11a is a SCR device 11a-s and the second device 11b is a diode device 11b-d. The SCR device 11a-s is controlled by a gate signal 15 from the gate driver 113. One phase of the AC voltage 141 connects to the serial device pair 13 at a midpoint 165 of the first device 11a-s and the second device 11b-d.

FIG. 1E is a schematic diagram of an IGBT/IGBT serial device pair 13. In the depicted embodiment, the first device 11a is an IGBT device 11a-i and the second device 11b is an IGBT device 11b-i. Each IGBT device 11ab-i includes a transistor 161 and a diode 163. Each IGBT device 11ab-i is controlled by a gate signal 15 from the gate driver 113. One phase of the AC voltage 141 connects to the midpoint 165 via an antiparallel SCR 185 and an inductor 181. In an alternative embodiment, one phase of the AC voltage 141 connects to the midpoint 165 via only the antiparallel SCR 185.

Figure 1F:
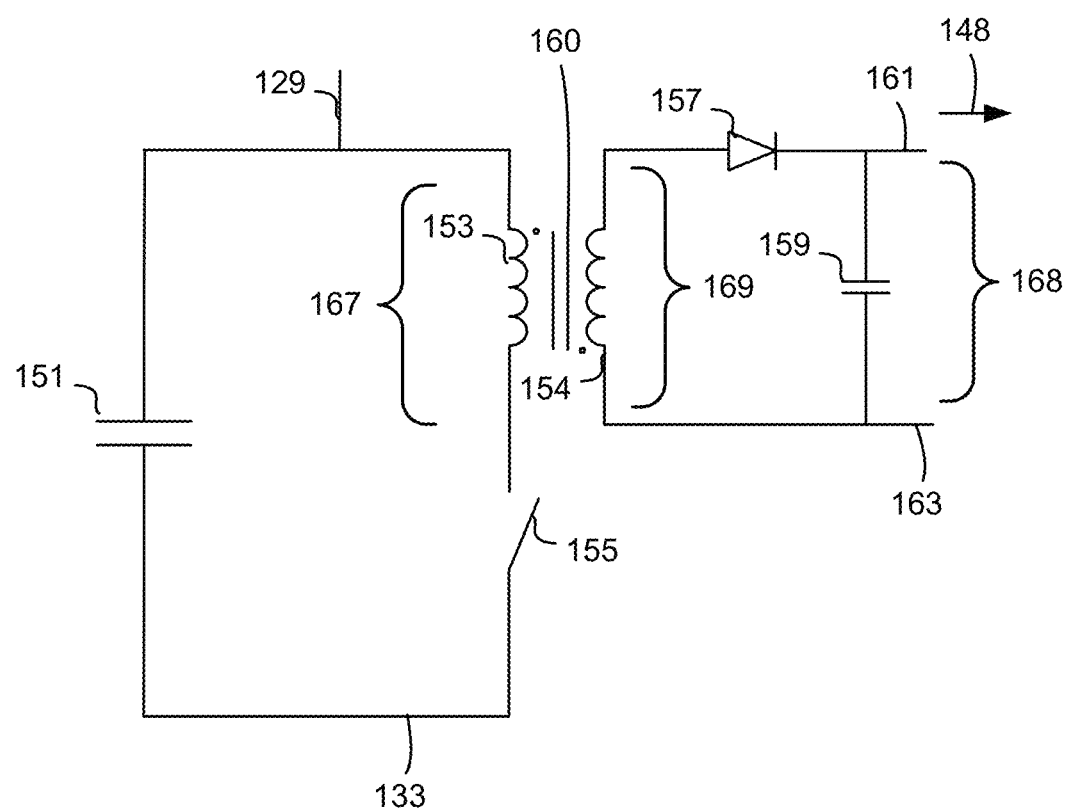
FIG. 1F is a schematic diagram of a SMPS according to an embodiment.

FIG. 1F is a schematic diagram of the SMPS 111. The SMPS 111 includes a transformer 160. The SMPS 111 receives the charging current 147 and/or SMPS current 145 at the charging input 129. The charging current 147 and/or SMPS current 145 may be filtered by a primary capacitor 151 and produce a primary voltage 167 across the primary winding 153 of the transformer 160. In one embodiment, a switch 155 is in series with the primary winding 153. The primary voltage 167 produces a secondary voltage 169 at a secondary winding 154. In one embodiment, an output diode 157 limits an output voltage 168 of the secondary voltage 169 at the SMPS output 161 to a single polarity. An output capacitor 159 may filter the output voltage 168 of the SMPS 111. The SMPS 111 supplies an SMPS current 148.

Figure 1G:
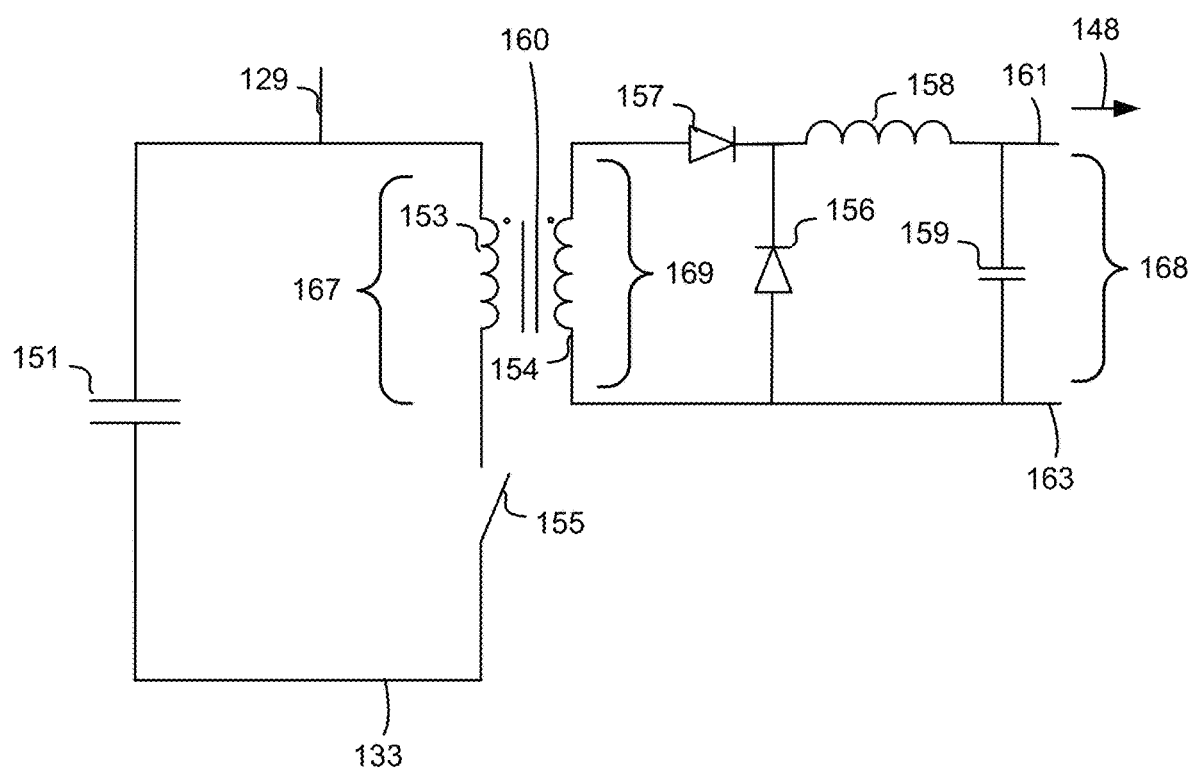
FIG. 1G is a schematic diagram of an SMPS according to an alternate embodiment.

FIG. 1G is a schematic diagram of an alternate embodiment of the SMPS 111. The SMPS 111 includes a transformer 160. The SMPS 111 receives the charging current 147 and/or SMPS current 145 at the charging input 129. The charging current 147 and/or SMPS current 145 may be filtered by a primary capacitor 151 and produce a primary voltage 167 across the primary winding 153. In one embodiment, a switch 155 is in series with the primary winding 153. The primary voltage 167 produces a secondary voltage 169 at a secondary winding 154. The output diode 157, an aliasing diode 156, and an output inductor 158 may limit the output voltage 168 to a single polarity. The output capacitor 159 may filter the output voltage 168.

Figure 1H:
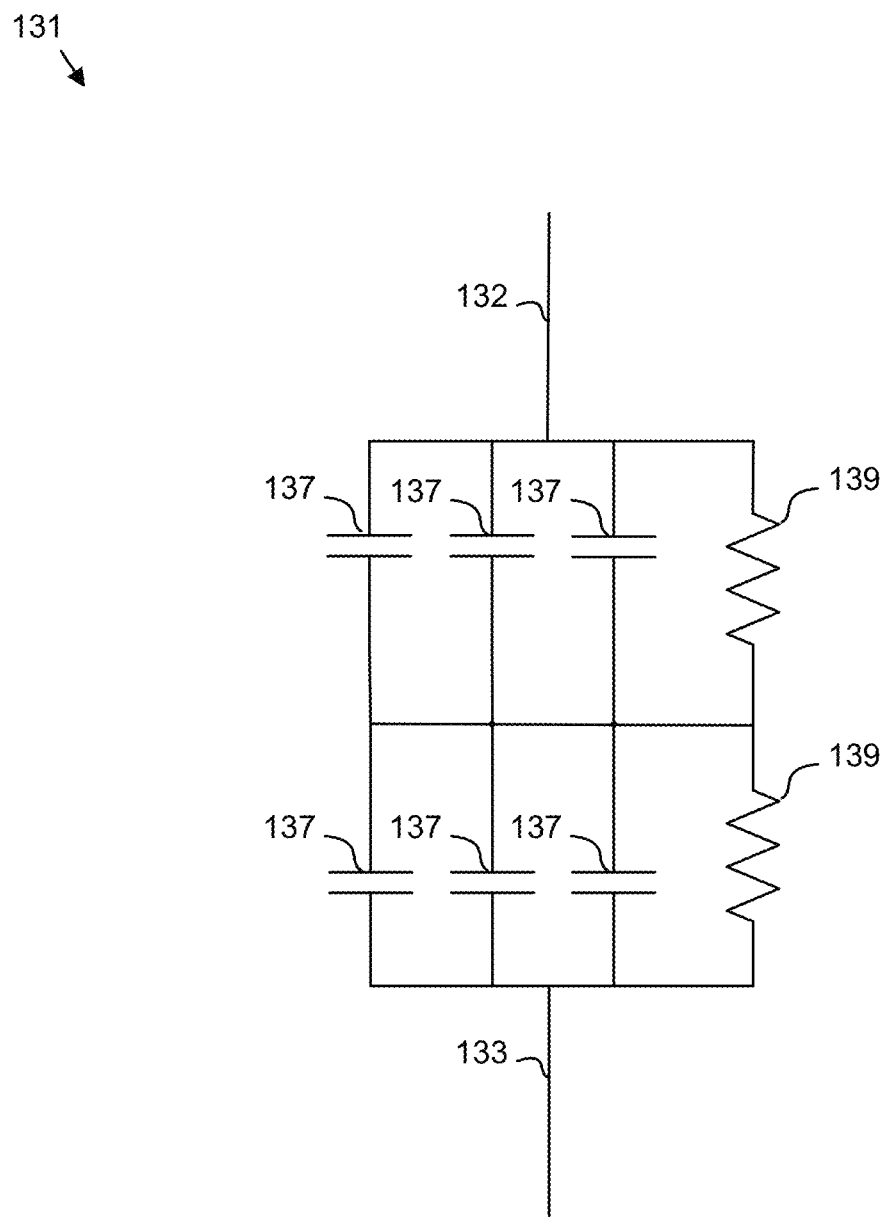
FIG. 1H is a schematic diagram of a DC bus capacitor according to an embodiment.

FIG. 1H is a schematic diagram of the DC bus capacitor 131. In the depicted embodiment, the DC bus capacitor 131 is connected to the charging line 132 and the common 133. The DC bus capacitor 131 may include a plurality of bus capacitors 137 arranged in series and/or in parallel. In the depicted embodiment, two bus balancing resistors 139 are included. In the depicted embodiment, each bus balancing resistor 139 is in parallel with one or more bus capacitors 137. In addition, a first parallel combination of bus capacitors 137 and a bus balancing resistor 139 is in series with at least one second parallel combination of bus capacitors 137 and a bus balancing resistor 139. Any number of parallel combinations of bus capacitors 137 may be employed.

Figure 1I:
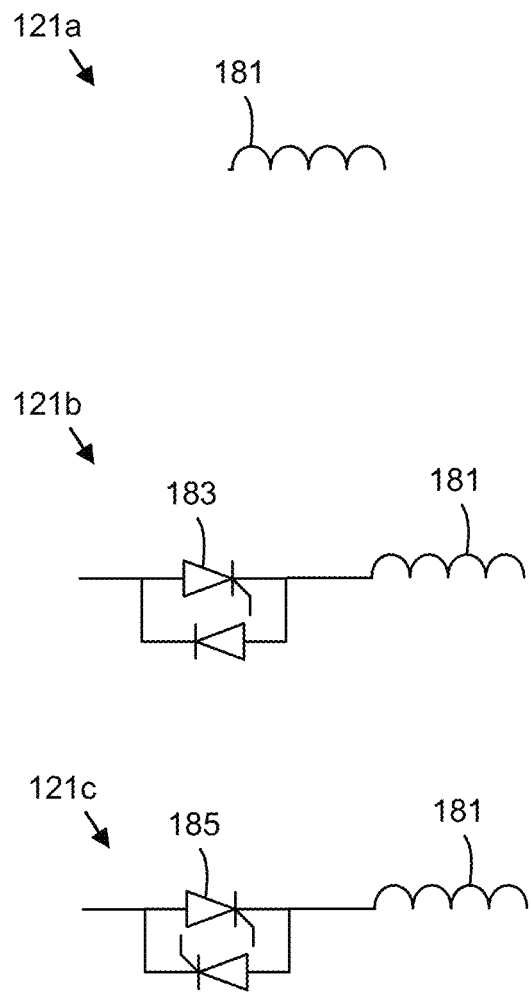
FIG. 1I is a schematic diagram of filters according to an alternate embodiment.

FIG. 1I is a schematic diagram of the filters 121. The filter 121a may comprise an inductor 181. In addition, the filter 121b may comprise an antiparallel SCR/diode pair 183 and the inductor 181. In one embodiment, the filter 121c comprises an antiparallel diode/diode pair 185 and the inductor 181.

Figure 2A:
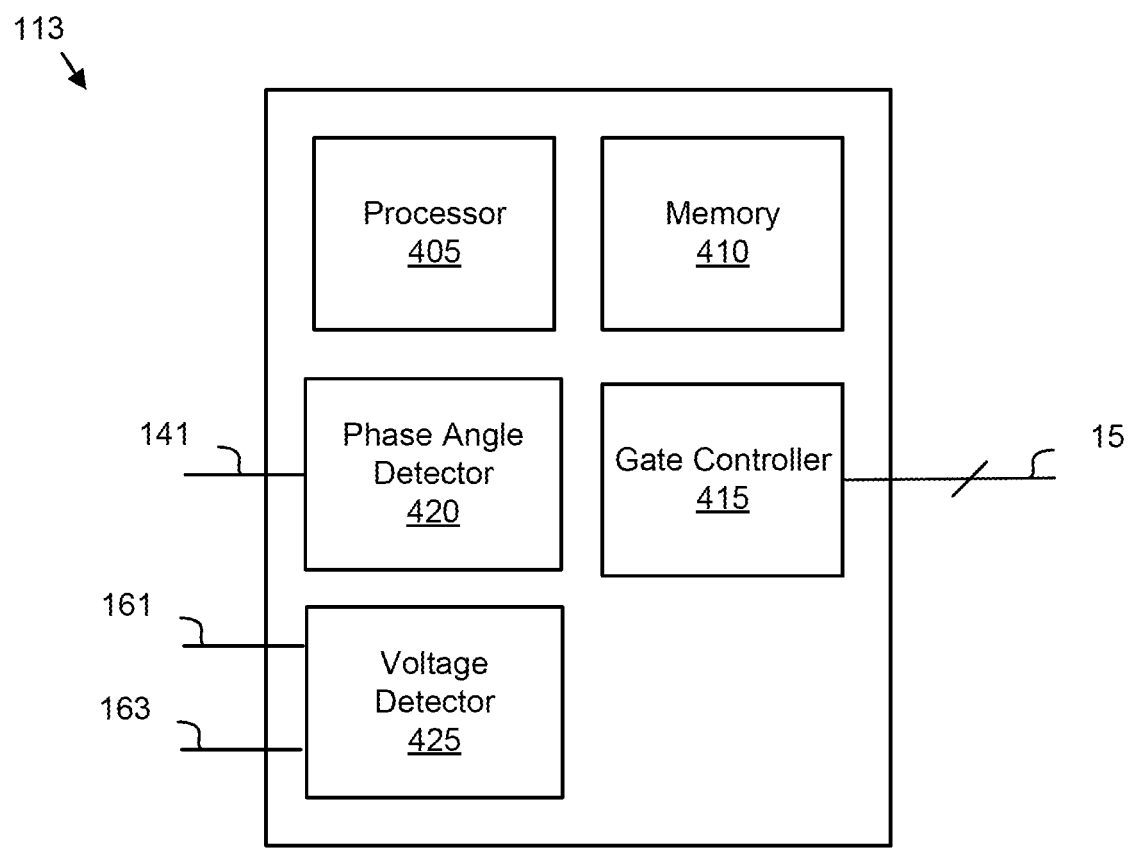
FIG. 2A is a schematic block diagram of a gate driver according to an embodiment.

FIG. 2A is a schematic block diagram of the gate driver 113. In the depicted embodiment, the gate driver 113 includes a processor 405, a memory 410, a phase angle detector 420, a voltage detector 425, and a gate controller 415. The memory 410 may store code and data. The processor 405 may execute the code and process the data.

The voltage detector 425 receives the SMPS output 161 and the SMPS common 163. In one embodiment, in response to detecting the regulation set point at the voltage detector 425, the gate driver 113 powers up. The SMPS output 161 and the SMPS common 163 may power the gate driver 113.

The phase angle detector 420 receives at least one phase of the AC voltage 141. In addition, the phase angle detector 420 may detect a specified phase angle of the at least one phase of the AC voltage 141. The gate controller 415 may drive the gate signals 15 as directed by the processor 405 based on the specified phase angle as will be described hereafter.

Figure 2B:
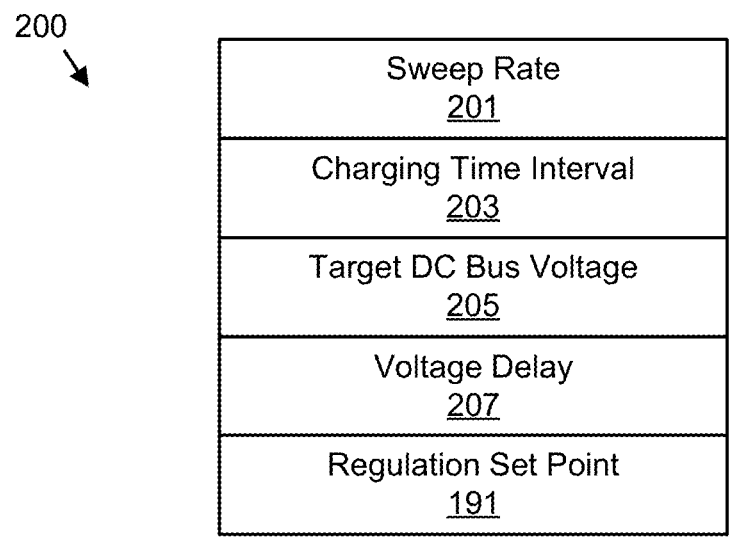
FIG. 2B is a schematic block diagram of pre-charge data according to an embodiment.

FIG. 2B is a schematic block diagram of pre-charge data 200. The pre-charge data 200 may be used to pre-charge the SMPS 111. The pre-charge data 200 may be organized as a data structure in the memory 410. In the depicted embodiment, the pre-charge data 200 includes a sweep rate 201, a charging time interval 203, the target DC bus voltage 205, a voltage delay 207, and the regulation set point 191.

The sweep rate 201 may specify a rate of firing for a sweep firing. The charging time interval 203 may specify a time interval for charging the DC bus capacitor 131 and/or the charging voltage 135 to the target DC bus voltage 205. The charging time interval 203 may be programmable.

The DC bus voltage 205 may specify a voltage at which the SMPS 111 begins full operation. In one embodiment, the gate driver 113 controls the serial device pairs 13 to charge the DC bus capacitor 131 to the target DC bus voltage 205 within the charging time interval 203.

The voltage delay 207 may specify a time interval from power on until the SMPS 111 reaches the regulation set point 191. In a certain embodiment, the gate driver 113 begins operation after the voltage delay 207. The regulation set point 191 may specify the output voltage 168 at which the gate driver 113 may begin operation powered by the SMPS output 161.

Figure 3:
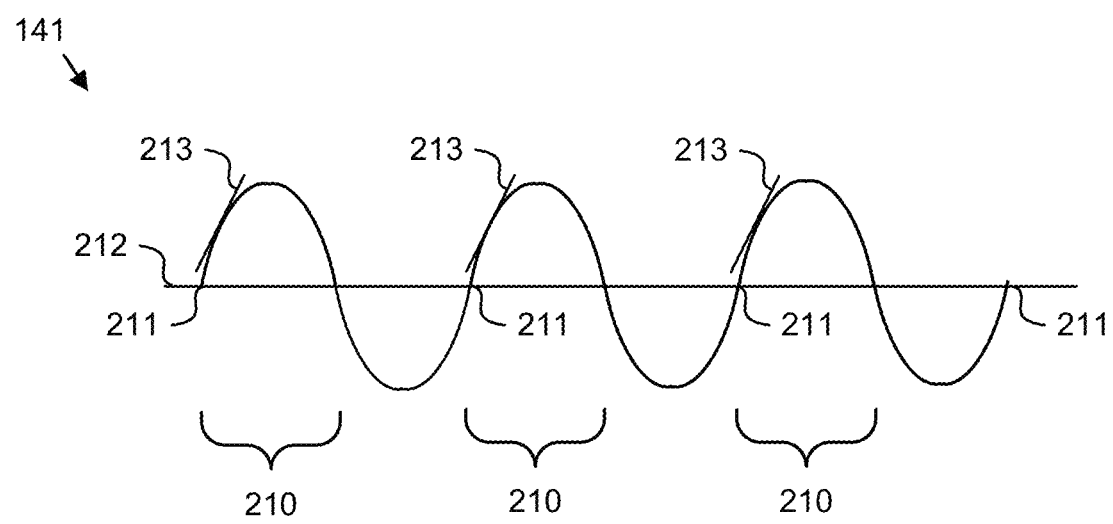
FIG. 3 is a drawing illustrating AC voltage according to an embodiment.

FIG. 3 is a drawing illustrating a phase of the AC voltage 141 relative to 0 volts 212. A specified phase angle 213 of the AC voltage 141 is shown. In addition, the zero crossing 211 of the AC voltage 141 is shown. In one embodiment, the specified phase angle 213 is the zero crossing 211. The phase angle detector 420 may detect the specified phase angle 213 and/or the zero crossing 211. The phase angle detector 420 may employ a phase locked loop to detect the specified phase angle 213. Based on detecting the specified phase angle 213 and/or the zero crossing 211, the phase angle detector 421 may determine a positive voltage interval 210 of the AC voltage 141. The charge generator 109 may charge the DC bus capacitor 131 during the positive voltage interval 210.

Figure 4:
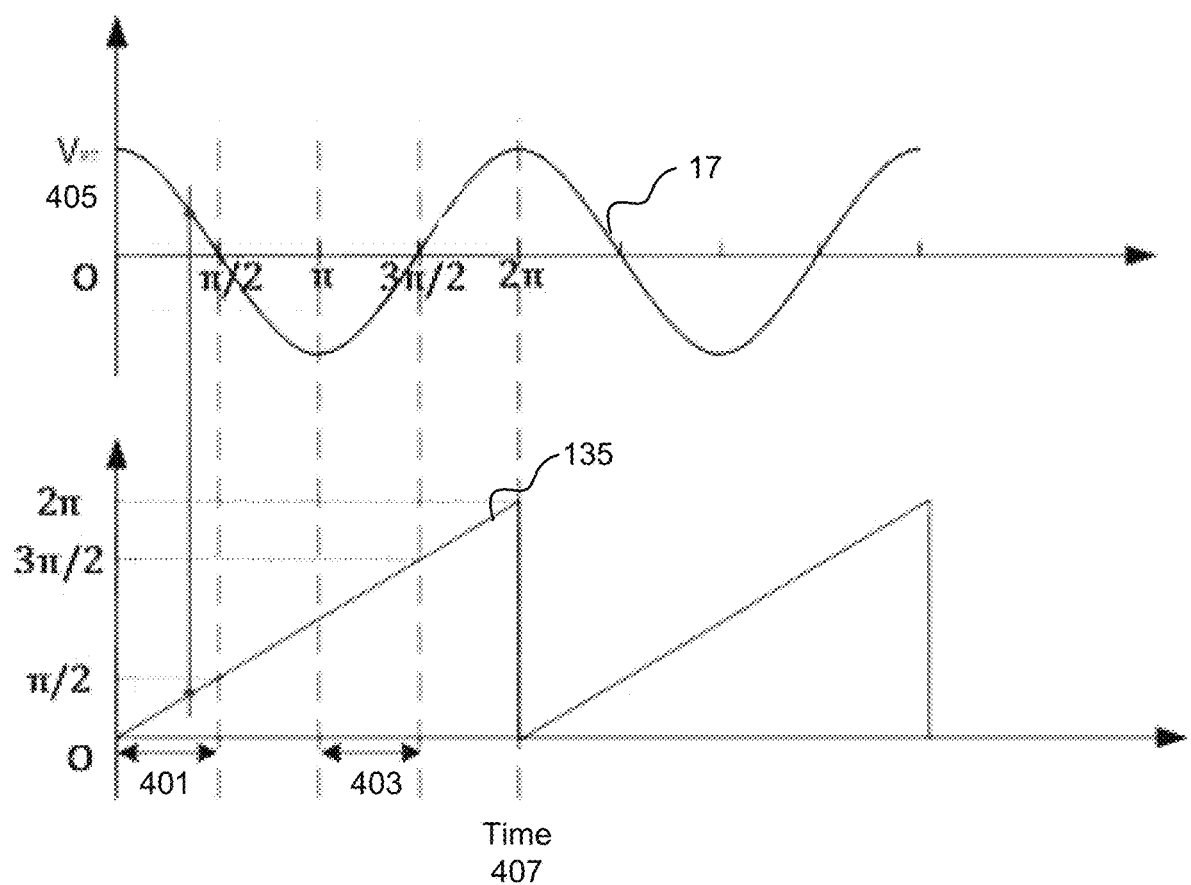
FIG. 4 is a drawing illustrating a sweeps firing according to an embodiment.

FIG. 4 is a drawing illustrating the sweeps firing 17. In the depicted embodiment, the sweeps firing 17 and the resulting charging voltage 135. For a first sweeps firing interval 401, the sweeps firing voltage VRT 405 is positive, sweeping back to π/2, firing the R phase of the AC voltage 141 in first devices 11a and the T phase of the AC voltage in the second devices 11b. The firing angle starts about π/2 and sweeps to zero. Time 407 may be a customer selected time. For a second sweeps firing interval 403, the sweeps firing voltage VRT 405 is positive, sweeping back to π/2, firing the T phase of the AC voltage 141 in first devices 11a and the R phase of the AC voltage in the second devices 11b. The firing angle starts about 3π/2 and sweeps to π.

Figure 5:
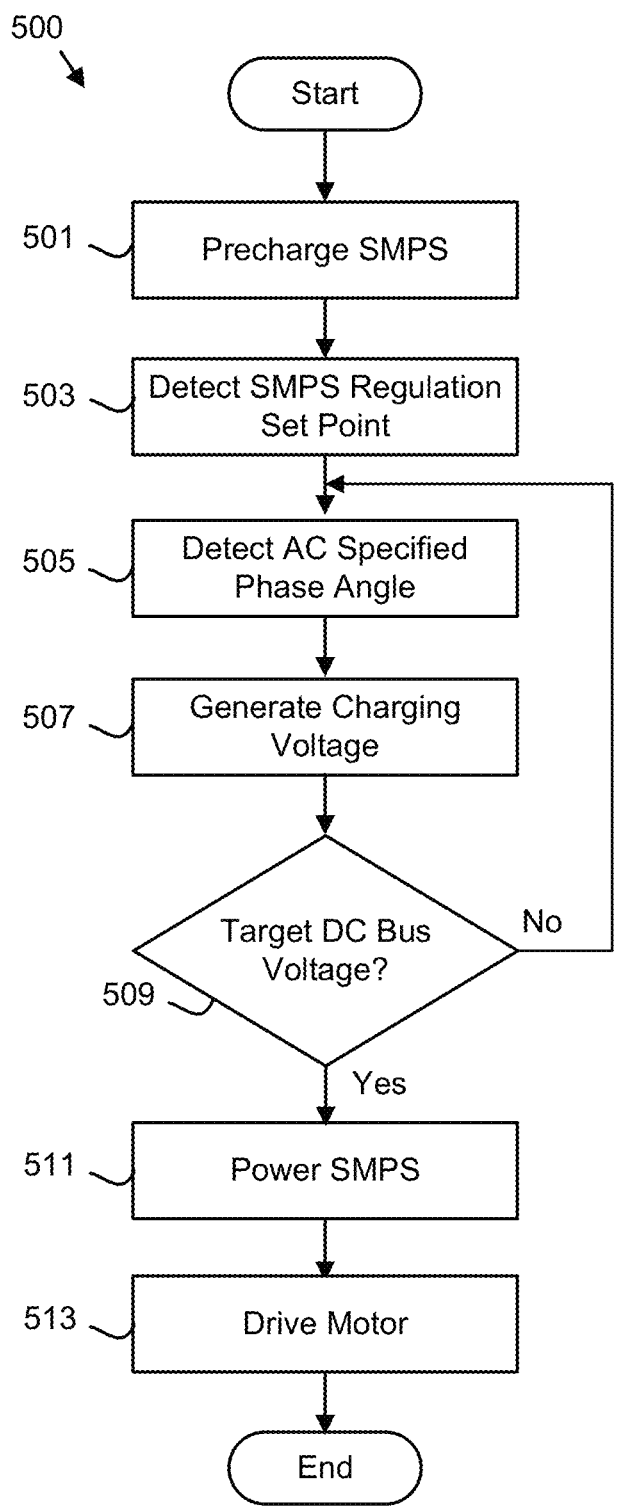
FIG. 5 is a schematic flow chart diagram illustrating an open loop pre-charge method according to an embodiment.

FIG. 5 is a schematic flow chart diagram illustrating an open loop pre-charge method 500. The method 500 may pre-charge the SMPS 111. The method 500 may be performed by the rectifier 102 and/or the processor 405 of the rectifier 102.

The method 500 starts, and in one embodiment, the SMPS charging diode 125 pre-charges 501 the SMPS 111 to the regulation set point 191. The SMPS charging diode 125 may pre-charge 501 the SMPS 111 from at least one phase of the AC voltage 141.

The processor 405 may detect 503 the regulation set point 191. The processor 405 may detect 503 the output voltage 168 at the regulation set point 191 at the SMPS output 161. In response to detecting the regulation set point 191, the charge generator 109 powers up.

The processor 405 may iteratively detect 505 the specified phase angle 213. The specified phase angle 213 may be the zero crossing 211.

In response to detecting 505 the specified phase angle 213, the charge generator 109 may iteratively generate 507 the charging voltage 135. The charge generator 109 may iteratively generate 507 the charging voltage 135 during the positive voltage interval 210. The charging voltage 135 charges the DC bus capacitor 131.

The charging voltage 135 may be generated 507 by the gate driver 113 via the control signals 15 applying the sweeps firing 17 to the first device 11a of an R serial device pair 13-R, turning ON a second device 11b of the R serial device pair 13-R, turning OFF a first device 11a of an S serial device pair 13-S, turning OFF a second device 11b of the S serial device pair 13-S, applying the sweeps firing 17 to a first device 11a of a T serial device pair 13-T, and turning ON a second device 11b of the T serial device pair 13-T. Table 1 illustrates one embodiment of the gate signals 15 for the serial device pairs 13.

TABLE 1

|     | 13-R            | 13-S | 13-T            |
|-----|-----------------|------|-----------------|
| 11a | Sweeps Firing 17 | OFF  | Sweeps Firing 17 |
| 11b | ON              | OFF  | ON              |

In one embodiment, the charging voltage 135 is generated 507 by the gate driver 113 via the gate signals 15 by turning ON a first device 11a of an R serial device pair 13-R, applying a sweeps firing 17 a second device 11b of the R serial device pair 13-R, turning ON a first device 11a of an S serial device pair 13-S, applying a sweeps firing 17 to a second device 11b of the S serial device pair 13-S, turning ON a first device 11a of a T serial device pair 13-T, and applying a sweeps firing 17 a second device 11b of the T serial device pair 13-T. Table 2 illustrates one embodiment of the gate signals 15 for the serial device pairs 13.

TABLE 2

|     | 13-R            | 13-S            | 13-T            |
|-----|-----------------|-----------------|-----------------|
| 11a | ON              | ON              | ON              |
| 11b | Sweeps Firing 17 | Sweeps Firing 17 | Sweeps Firing 17 |

In one embodiment, the charging voltage 135 is generated 507 by the gate driver 113 via the gate signals 15 by turning ON a first device 11a of an R serial device pair 13-R, applying a sweeps firing 17 a second device 11b of the R serial device pair 13-R, turning ON a first device 11a of an S serial device pair 13-S, turning OFF a second device 11b of the S serial device pair 13-S, turning ON a first device 11a of a T serial device pair 13-T, and applying a sweeps firing 17 a second device 11b of the T serial device pair 13-T. Table 3 illustrates one embodiment of the gate signals 15 for the serial device pairs 13.

TABLE 3

|     | 13-R            | 13-S | 13-T            |
|-----|-----------------|------|-----------------|
| 11a | ON              | ON   | ON              |
| 11b | Sweeps Firing 17 | OFF  | Sweeps Firing 17 |

In one embodiment, the charging voltage 135 is generated 507 by the gate driver 113 via the gate signals 15 by applying a sweeps firing 17 each first device 11a of the three serial device pairs 13 and turning ON each second device 11b of the three serial device pairs 13. Each diode second device 11b-d is always ON. Table 4 illustrates one embodiment of the gate signals 15 for the serial device pairs 13.

TABLE 4

|  | 13-R | 13-S | 13-T |
|---|---|---|---|
| 11a | Sweeps Firing 17 | Sweeps Firing 17 | Sweeps Firing 17 |
| 11b | ON | ON | ON |

In one embodiment, the charging voltage 135 is generated 507 by the gate driver 113 via the gate signals 115 by applying a sweeps firing 17 to a first device 11a of an R serial device pair 13-R, turning ON a second device 11b of the R serial device pair 13-R, turning OFF a first device 11a of an S serial device pair 13-S, turning ON a second device 11b of the S serial device pair 13-S, applying the sweeps firing 17 to a first device 11a of a T serial device pair 13-T, and turning ON a second device 11b of the T serial device pair 13-T. Each diode second device 11b-d is always ON. Table 5 illustrates one embodiment of the gate signals 15 for the serial device pairs 13.

TABLE 5

|  | 13-R | 13-S | 13-T |
|---|---|---|---|
| 11a | Sweeps Firing 17 | OFF | Sweeps Firing 17 |
| 11b | ON | ON | ON |

The processor 405 may determine 509 if the DC bus capacitor 131 and/or the charging voltage 135 is at the target DC bus voltage 205. If the DC bus capacitor 131 and/or charging voltage 135 is at the target DC bus voltage 205, the charge generator 109 powers 511 the SMPS 111. As a result, the rectifier 102 may supply power to the motor inverter 103 and the motor inverter 103 may drive 513 the motor 105 and the method 500 ends.

If the DC bus capacitor 131 and/or charging voltage 135 are not at the target DC bus voltage 205, the processor 405 iteratively detects 505 the specified phase angle 213 and the charge generator 109 may iteratively generate 507 the charging voltage 135 until the DC bus capacitor 131 and/or charging voltage 135 is at the target DC bus voltage 205.

Figure 6A:
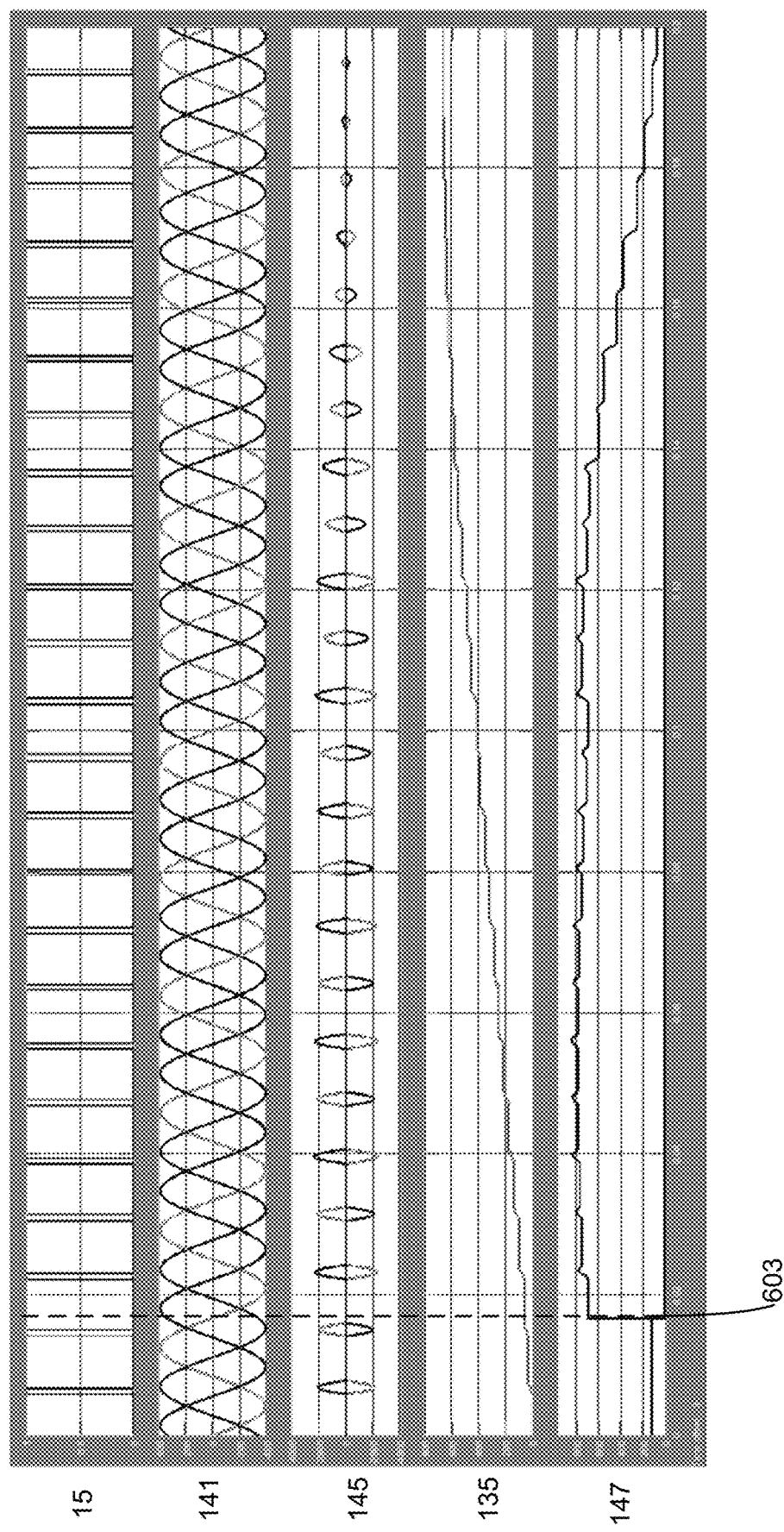
FIG. 6A is wave forms illustrating a single-phase full wave pre-charge according to an embodiment.

FIG. 6A is wave forms illustrating a single-phase full wave pre-charge of the SMPS 111. The gate signals 15, DC voltage 141, SMPS current 145, charging voltage 135, and charging current 147 are shown. In the depicted embodiment, the charge generator 109 is powered up and starts phase control 603 and pre-charges the DC bus capacitor 131 and/or charging voltage 135.

Figure 6B:
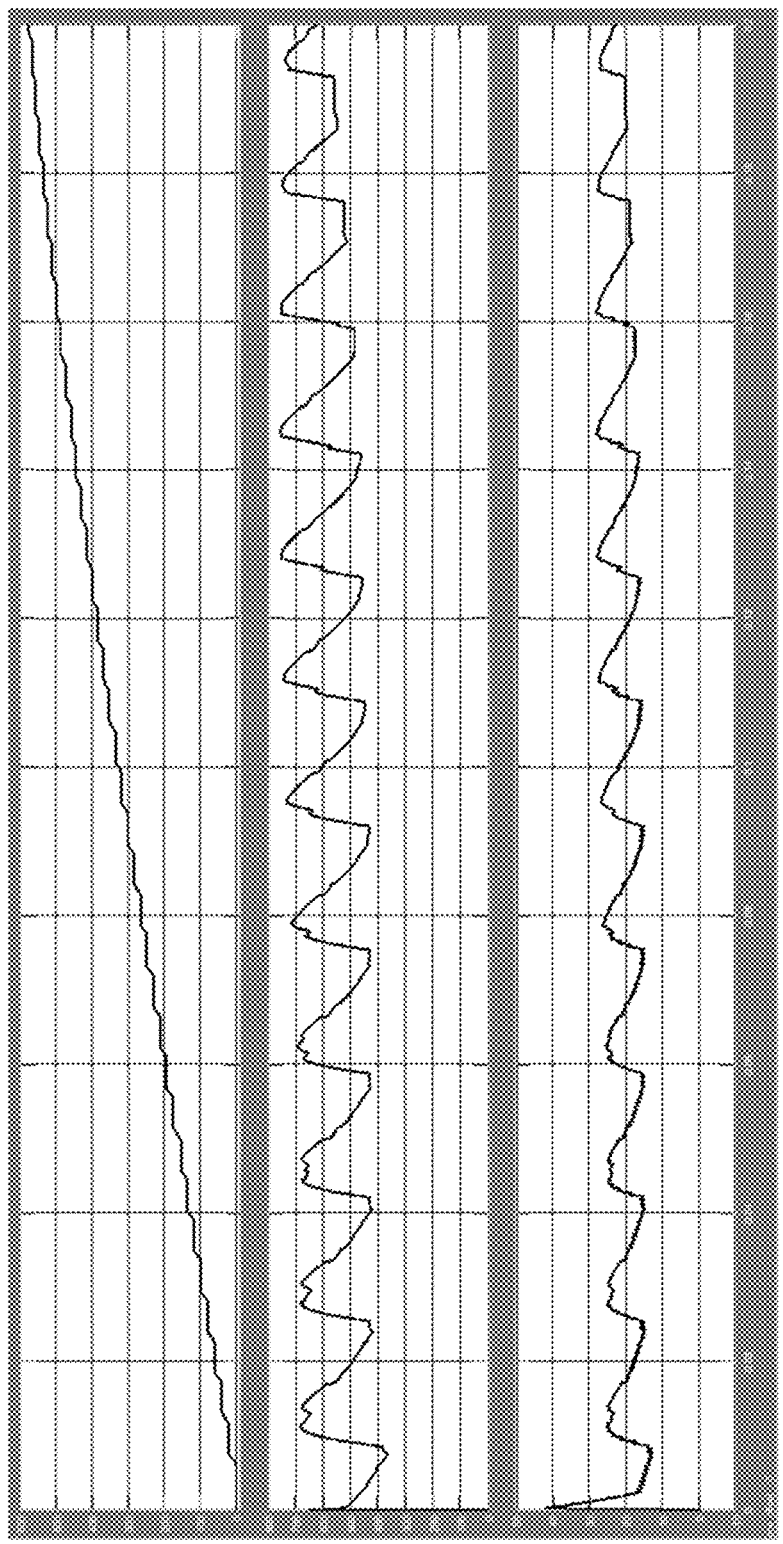
FIG. 6B is wave forms illustrating an SMPS power up simulation according to an embodiment.

FIG. 6B is wave forms illustrating an SMPS power up. The charging voltage 135, primary voltage 167, and secondary voltage 169 are shown.

Figure 6C:
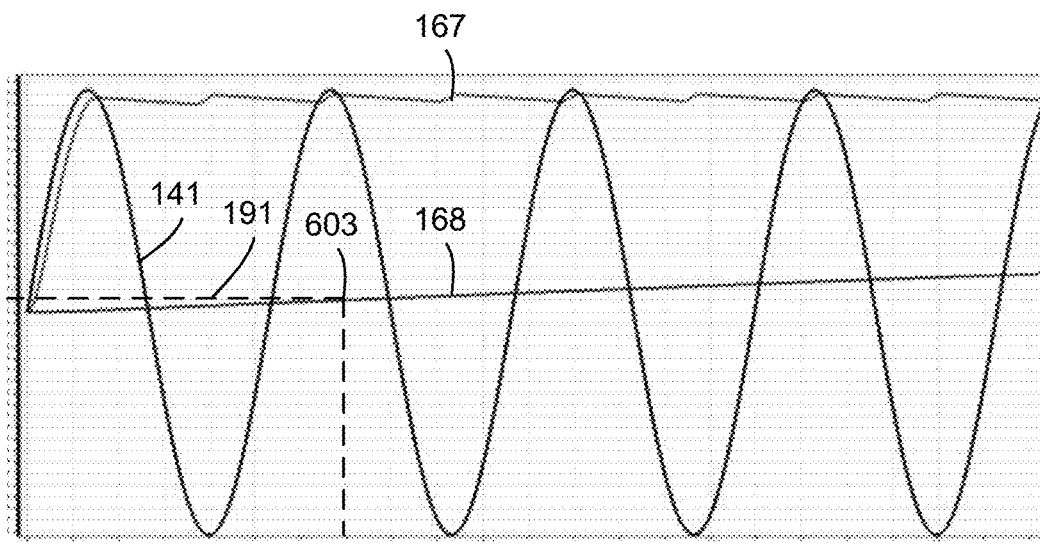
FIG. 6C is wave forms illustrating AC pre-charging of SMPS input according to an embodiment.

FIG. 6C is wave forms illustrating AC pre-charging of SMPS input. The AC voltage 141, the output voltage 168, and the primary voltage 167 are shown. In the depicted embodiment, the output voltage 168 increases until the regulation set point 191 is reached. At the regulation set point 191, the gate driver 113 powers up and starts phase control 603.

Figure 6D:
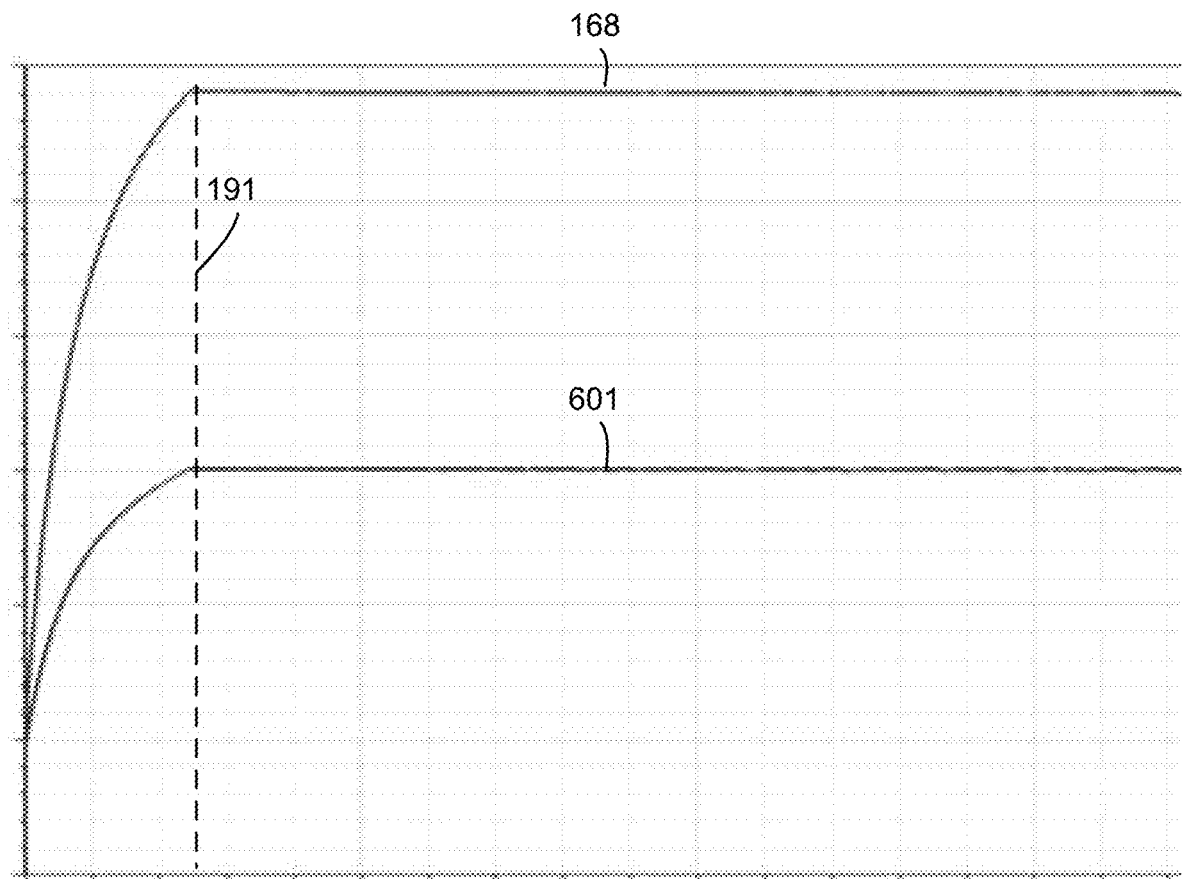
FIG. 6D is wave forms illustrating SMPS powering and regulation according to an embodiment.

FIG. 6D is wave forms illustrating SMPS powering and regulation. The output voltage 168 and an SCR gate power supply voltage 601 for generating the gate signals 15 are shown. The output voltage 168 rises to the regulation set point 191, where regulation begins. Regulation of the SCR gate power supply voltage 601 also begins at the regulation set point 191.

Problem/Solution

The rectifier 102 of a VFD must be charged before supplying electrical power to the motor inverter 103 and motor 105. In the past pre-charge resistors have been used to support the pre-charging of the rectifier 102. However, the pre-charge resistors require a high temperature rating and/or cooling system, limit the capacitance, and increase the cost of the motor system 100. In addition, pre-charge resistors may be bypassed after pre-charge is complete.

The embodiments employ the SMPS diode 125 that pre-charges the SMPS 111 to the regulation set point 191. The charge generator 109 powered by the pre-charged SMPS 111 detects the regulation set point 191 and thereafter iteratively detects a specified phase angle 213 of the AC voltage 141. In response to the specified phase angle 213, the charge generator 109 iteratively generates the charging voltage 135 during the positive voltage intervals 210. As a result, the embodiments support the cost-effective pre-charging of the rectifier 102. In addition, the rectifier 102 may be pre-charged in an open loop, further reducing the cost of pre-charging.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
    a Switching Mode Power Supply (SMPS) charging diode that pre-charges an SMPS to a regulation set point directly from at least one phase of an Alternating Current (AC) voltage; and
    a charge generator comprising a gate driver that is powered by the pre-charged SMPS to detect the regulation set point and a specified phase angle and in response to detecting the regulation set point iteratively detects the specified phase angle of the AC voltage and in response to the specified phase angle, the gate driver controls the charge generator to iteratively generate a charging voltage during a positive voltage interval that charges a Direct Current (DC) bus capacitor to a target DC bus voltage within a charging time interval;
    wherein at least a portion of the charge generator comprises one or more of hardware and executable code, the executable code stored on one or more non-transitory computer readable storage media.

2. The apparatus of claim 1, wherein the specified phase angle is a zero crossing.

3. The apparatus of claim 1, wherein the charge generator comprises three serial device pairs, wherein each serial device pair comprises a first device and second device and one phase of the AC voltage connects to the serial device pair at a midpoint of the first device and the second device.

4. The apparatus of claim 3, wherein the first device is a Silicon Controlled Rectifier (SCR) device and the second device is a SCR device.

5. The apparatus of claim 3, wherein the first device is a Silicon Controlled Rectifier (SCR) device and the second device is a diode device.

6. The apparatus of claim 3, wherein the first device is an Insulated Gate Bipolar-Transistor (IGBT) device and the second device is an IGBT device and the one phase of the AC voltage connects to the midpoint via an antiparallel Silicon Controlled Rectifier (SCR) and an inductor.

7. The apparatus of claim 3, wherein the charging voltage is generated by applying a sweeps firing to a first device of an R serial device pair, turning ON a second device of the R serial device pair, turning OFF a first device of an S serial device pair, turning OFF a second device of the S serial device pair, applying the sweeps firing to a first device of a T serial device pair, and turning ON a second device of the T serial device pair.

8. The apparatus of claim 3, wherein the charging voltage is generated by turning ON a first device of an R serial device pair, applying a sweeps firing a second device of the R serial device pair, turning ON a first device of an S serial device pair, applying a sweeps firing to a second device of the S serial device pair, turning ON a first device of a T serial device pair, and applying a sweeps firing a second device of the T serial device pair.

9. The apparatus of claim 3, wherein the charging voltage is generated by turning ON a first device of an R serial device pair, applying a sweeps firing a second device of the R serial device pair, turning ON a first device of an S serial device pair, turning OFF a second device of the S serial device pair, turning ON a first device of a T serial device pair, and applying a sweeps firing a second device of the T serial device pair.

10. The apparatus of claim 5, wherein the charging voltage is generated by applying a sweeps firing to each first device of the three serial device pairs and turning ON each second device of the three serial device pairs.

11. The apparatus of claim 3, wherein the charging voltage is generated by applying a sweeps firing to a first device of an R serial device pair, turning ON a second device of the R serial device pair, turning OFF a first device of an S serial device pair, turning ON a second device of the S serial device pair, applying the sweeps firing to a first device of a T serial device pair, and turning ON a second device of the T serial device pair.

12. The apparatus of claim 1, wherein the charging time interval is programmable.

13. The apparatus of claim 1, wherein the charging time interval is less than 2 line cycles.

14. The apparatus of claim 1, wherein no pre-charge resistor is in series with the DC bus capacitor and a DC charge diode is only rated to charge the SMPS.

15. The apparatus of claim 14, the apparatus further comprising the DC charge diode that blocks current from SMPS to the DC bus capacitors.

16. A method comprising:
pre-charging a Switching Mode Power Supply (SMPS) to a regulation set point directly from at least one phase of an Alternating Current (AC) voltage;
detecting the regulation set point and a specified phase angle with a charge generator comprising a gate driver that is powered by the pre-charged SMPS;
in response to detecting the regulation set point, iteratively detecting the specified phase angle of the AC voltage; and
in response to detecting the specified phase angle, iteratively generating a charging voltage during a positive voltage interval that charges a Direct Current (DC) bus capacitor to a target DC bus voltage within a charging time interval.

17. The method of claim 16, wherein the specified phase angle is a zero crossing.

18. The method of claim 16, wherein the charge generator comprises three serial device pairs, wherein each serial device pair comprises a first device and second device and one phase of the AC voltage connects to the serial device pair at a midpoint of the first device and the second device.

19. The method of claim 18, wherein the first device is a Silicon Controlled Rectifier (SCR) device and the second device is a SCR device.

20. A system comprising:
a motor;
a motor inverter that drives the motor;
a rectifier that supplies power to the motor inverter, the rectifier comprising:
a Switching Mode Power Supply (SMPS) charging diode that pre-charges an SMPS to a regulation set point directly from at least one phase of an Alternating Current (AC) voltage; and
a charge generator comprising a gate driver that is powered by the pre-charged SMPS to detect the regulation set point and a specified phase angle and in response to detecting the regulation set point iteratively detects the specified phase angle of the AC voltage and in response to the specified phase angle, the gate driver controls the charge generator to iteratively generates a charging voltage during a positive voltage interval that charges a Direct Current (DC) bus capacitor to a target DC bus voltage within a charging time interval;
wherein at least a portion of the charge generator comprises one or more of hardware and executable code, the executable code stored on one or more non-transitory computer readable storage media.

* * * * *